(12) United States Patent  (10) Patent No.: US 6,608,584 B1
Faulkner                   (45) Date of Patent: Aug. 19, 2003

(54) SYSTEM AND METHOD FOR BISTATIC SAR IMAGE GENERATION WITH PHASE COMPENSATION

(75) Inventor: David A. Faulkner, Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/075,491

(22) Filed: Feb. 12, 2002

(51) Int. Cl.$^7$ .............................................. G01S 13/00
(52) U.S. Cl. ........................... 342/25; 342/77; 342/102; 342/149
(58) Field of Search ..................... 342/25, 149, 152, 342/161, 163, 62, 77–80, 102–103, 127, 194

(56) References Cited

U.S. PATENT DOCUMENTS

| | | | | |
|---|---|---|---|---|
| 4,387,373 A | * | 6/1983 | Longuemare, Jr. | ............ 342/25 |
| 5,012,249 A | * | 4/1991 | Chan | ............. 342/25 |
| 5,430,445 A | * | 7/1995 | Peregrim et al. | ............. 342/25 |
| 5,473,331 A | | 12/1995 | Kennedy et al. | |
| 5,952,955 A | | 9/1999 | Kennedy et al. | |
| 5,959,573 A | | 9/1999 | Krikorian et al. | |
| 6,020,843 A | | 2/2000 | Krikorian et al. | |

* cited by examiner

Primary Examiner—Thomas H. Tarcza
Assistant Examiner—Isam Alsomiri
(74) Attorney, Agent, or Firm—Thomas J. Finn; Colin M. Raufer; Glenn H. Lenzen, Jr.

(57) ABSTRACT

A method and bistatic synthetic aperture radar (SAR) imaging system generate an image of a target area without knowledge of the position or velocity of the illuminator. The system includes an illuminator to illuminate a target area with a null-monopulse radiation pattern interleaved with a sum radiation pattern. The illuminator adjusts the phase terms of the sum radiation pattern to maintain a static electromagnetic field pattern at the target area. A receiver receives the radiation patterns reflected from the target area and generates phase compensation terms by correlating a measured electromagnetic vector field with the known static electromagnetic vector field. The phase compensation terms are used to generate an image of the target area.

22 Claims, 7 Drawing Sheets

SYSTEM AND METHOD FOR BISTATIC SAR IMAGE GENERATION WITH PHASE COMPENSATION

FIELD OF THE INVENTION

The present invention pertains to radar systems, and in particular, synthetic aperture radar (SAR), and in one aspect, to the generation of images with bistatic SAR.

BACKGROUND OF THE INVENTION

Bistatic SAR is a process of generating an image of the reflected electromagnetic energy from the surface of the earth by combining the magnitude and phase measurements of many spatially distributed locations of an illuminator and/or a receiver. In bistatic SAR, measurements are generally compensated for illuminator location and motion, reflective surface location, and receiver location and motion. Phase compensation is generally performed for each fast-time and slow-time sampling of the measured signals. The phase compensation coefficients can be determined accurately when the location and motion of the illuminator and receiver are accurately known. Unlike monostatic SAR where the illuminator and receiver are co-located, this information is difficult to accurately obtain in bistatic SAR making it difficult to align the two separate reference systems of a bistatic SAR system. As a result, the generation of quality images in a bistatic SAR is difficult.

Conventional bistatic SAR imaging systems have used a data-link between the illuminator and receiver to communicate the location and motion information. This approach increases the complexity of such systems and furthermore, has several inherent difficulties and risks. For example, maintaining a data link in a real-time operational environment may be difficult due to interfering and jamming signals resulting in an inability to generate a quality image. It may also give away the location of the illuminator or receiver and may require that the receiver and illuminator be within line-of-site depending on the frequency.

Thus there is a general need for an improved method and system for generating of a bistatic SAR image. There is also a need for a method and system for generating a bistatic SAR image without a data-link to convey positional information between the illuminator and the receiver. There is also a need for a method and system for generating a bistatic SAR image without knowledge of the illuminator's position and heading. There is also a need for a method and system for generating a bistatic SAR image without alignment of the receiver and illuminator.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

DETAILED DESCRIPTION

BRIEF SUMMARY OF THE INVENTION

The description set out herein illustrates the various embodiments of the invention and such description is not intended to be construed as limiting in any manner. In one embodiment, a method and bistatic SAR imaging system provides, among other things, high resolution two dimensional information on a target area. The ground imaging system includes an illuminator to illuminate a target area with interleaved radiation patterns. The patterns may be a null-monopulse radiation pattern interleaved with a sum radiation pattern. The illuminator adjusts the phase terms of the sum radiation pattern to compensate for motion of the illuminator and the aspect angle of the illuminator to generate a static electromagnetic vector field pattern. The static electromagnetic vector field pattern, which may be formed by taking the ratio of the null to sum received patterns, is known by the receiver. The receiver receives the radiation patterns reflected from the target area and correlates the ratio from the measured vector field pattern with the known static vector field pattern to generate the phase compensation terms. The receiver generates an image of the target area based on the phase compensation terms. In one embodiment, the phase compensation terms of the correlated static field pattern may also compensate for the motion of the receiver.

The system and method may reduce the need for a data link between the illuminator and receiver because, among other things, the positional information about the illuminator is not required by the receiver to generate an image of a target area. This, for example, reduces the complexity of the illuminator and receiver and allows the illuminator the additional flexibility of not having to communicate directly with the receiver.

Figure 1:
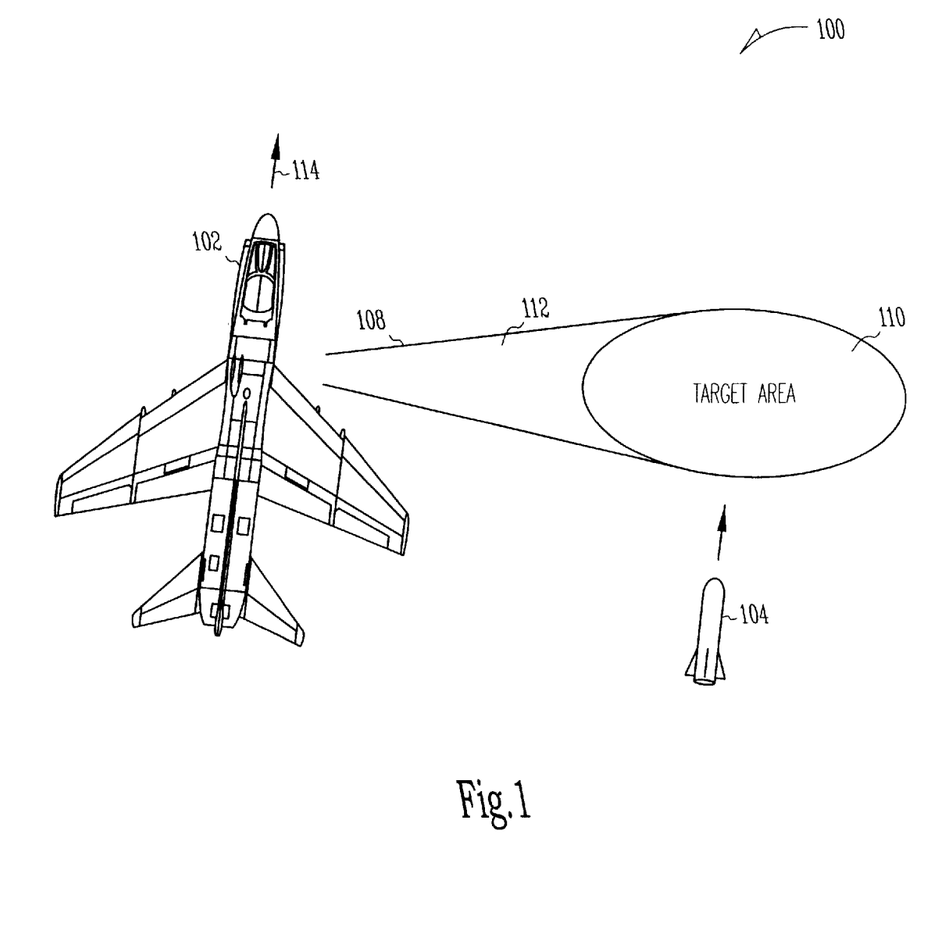
FIG. 1 is a top view illustrating the operation of a bistatic SAR imaging system in accordance with an embodiment of the present invention.

FIG. 1 illustrates a top view illustrating the operation of a bistatic SAR imaging system in accordance with an embodiment of the present invention. System 100 includes illuminator 102 which transmits radiation patterns toward target area 110. Target area 110 reflects and scatters the radiation patterns. Receiver 104 receives the radiation patterns reflected and/or scattered by target area 110 and generates a bistatic SAR image of target area 110. Illuminator 102 may be an aircraft or satellite moving in direction 114 substantially orthogonal to target area 110. Receiver 104 may be a stationary receiver, or a receiver moving in the direction of the target area. Receiver 104, for example, may be a weapon such as missile which may be moving substantially in a direction toward target area 110. In an alternate embodiment, illuminator 102 may be stationary and receiver 104 may be moving. The image of the target area may be used by receiver 104 to locate a target within target area 110 for guidance.

In accordance with an embodiment, illuminator 102 illuminates target area 110 with radiation patterns such as a null-monopulse radiation pattern 108 and a sum radiation pattern 112. In one embodiment, illuminator 102 interleaves the null-monopulse radiation pattern with the sum radiation pattern. Similar radiation patterns may be found, for example, in U.S. Pat. No. 5,473,331, which is incorporated herein by reference. Illuminator 102 adjusts the phase terms of sum radiation pattern 112 to at least compensate for motion of illuminator 102. System 100 also includes receiver 104 which receives the radiation patterns reflected from the target area. Receiver 104 generates phase compensation terms based at least on a predetermined or known field pattern, and may generate an image of the target area using the terms of the adjusted sum radiation pattern and terms of the received null-monopulse pattern.

Illuminator 102 may dynamically adjust the phase terms of the sum radiation pattern by observing energy reflected from the target area to create a static electromagnetic vector field at the target area. The vectors comprising the vector field may be determined from a ratio of the reflected null-monopulse radiation pattern and the reflected sum radiation pattern. Illuminator 102 may observe the reflected energy through the same antenna used to illuminate the target area to verify the creation of the static electromagnetic vector field and adjust the radiation patterns accordingly. The static vector field is desirably a constant phase and magnitude electromagnetic field for each cell in target area 110. The antenna used by illuminator 102 may be a quadrant-feed type antenna.

In one embodiment, illuminator 102, in generating the static vector field, adjusts the phase terms of the of the sum radiation pattern to compensate for an aspect angle of illuminator 102 relative to target area 110. Receiver 104 may generate a measured vector field based on a complex ratio of the received null-monopulse radiation pattern to the received sum radiation pattern. Receiver 104 may correlate the measured vector field with the known static electromagnetic vector field to generate a two-dimensional phase compensation matrix comprised of phase compensation terms. Receiver 104 generates a bistatic SAR image of the target area based on the phase compensation terms. The difference between the measured vector field pattern and the known static vector field pattern represents the image.

Accordingly, receiver 104 may calculate phase compensation terms for bistatic SAR image formation without accurate knowledge of the position or motion of illuminator 102. Receiver 104 may determine the phase compensations terms by examining a constant phase and magnitude electromagnetic field for each cell in the target area. Range and Doppler information for a particular cell may be determined at receiver 104 by time sampling sub-intervals in a coherent collection period and performing two-dimensional Fourier transforms on the pulse compressed range samples to resolve Doppler and range for each cell of the target area. The phase compensation terms align the measured pattern to the known reference static vector field pattern. The image of the compensated pattern represents an undistorted image of target area 110.

In one embodiment, the present invention provides a receiver for generating a bistatic SAR image of a target area. The receive includes an antenna to receive radiation patterns reflected from the target area and a processing element to generate phase compensation terms by correlating a measured electromagnetic vector field with a static electromagnetic vector field, and to generate an image of the target area using the phase compensation terms. The receiver may also include a memory to store components of the static electromagnetic vector field. In this embodiment, an illuminator illuminates the target area with a null-monopulse radiation pattern interleaved with a sum radiation pattern, and dynamically adjusts the phase terms of the sum radiation pattern to maintain a static electromagnetic vector field at the target area.

Figure 2:
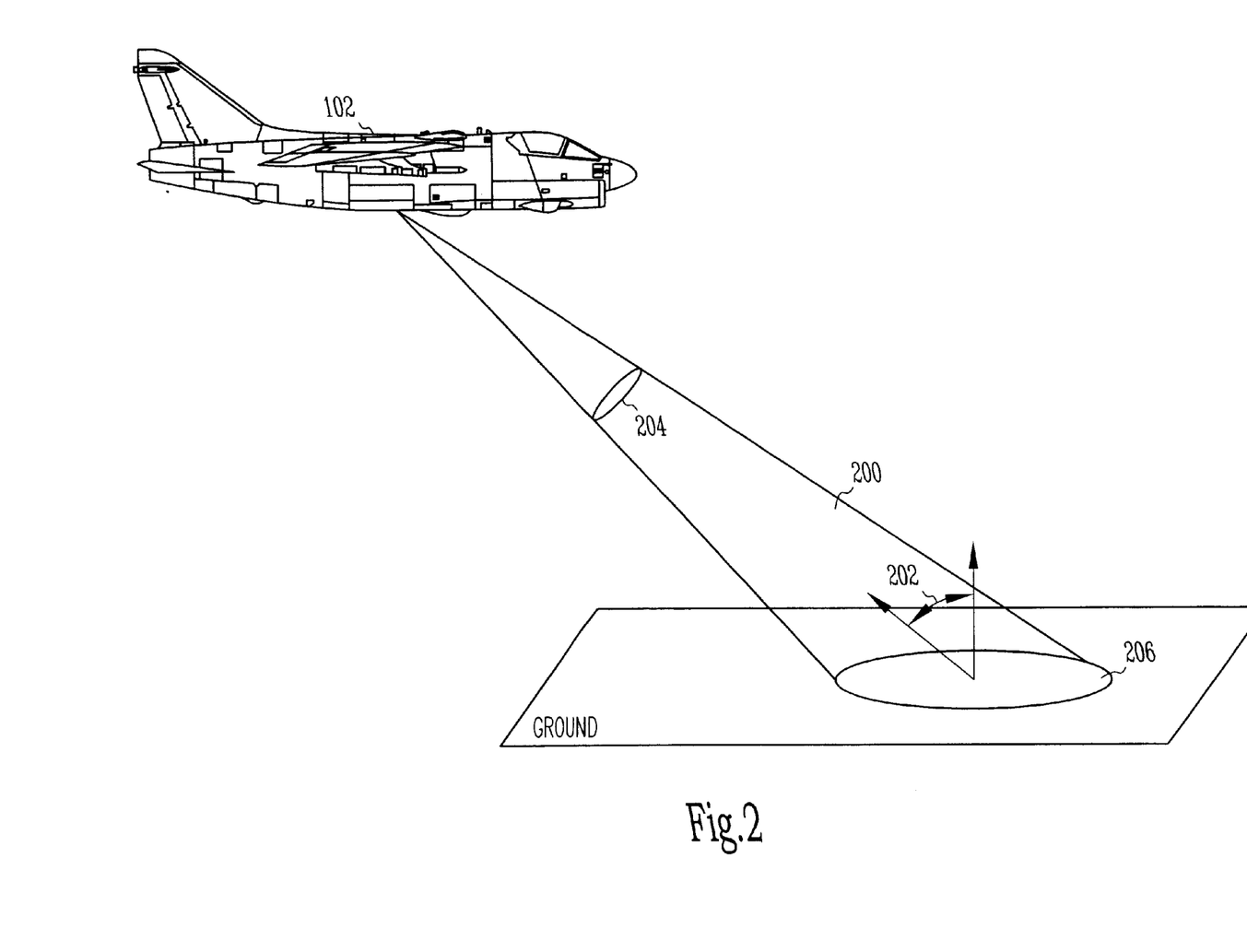
FIG. 2 illustrates the projection of a radiation pattern onto the ground in accordance with an embodiment of the present invention.

FIG. 2 illustrates the projection of a radiation pattern onto the ground in accordance with an embodiment of the present invention. Radiation pattern 200 may be transmitted by an illuminator, such as illuminator 102 (FIG. 1). Radiation pattern 200 is elliptically warped at the target area because of aspect angle 202 although pattern 200 may be transmitted with a more circular cross section 204. In other words, the further in range the illuminator is away from target area 206, the more the radiation pattern is elliptically warped. This enlarges the down-range pattern on the ground. By controlling the illumination pattern, a static electromagnetic vector field may be generated to reduce or substantially eliminate the elliptical warping to present a substantially circular electromagnetic vector field pattern. In accordance with an embodiment of the present invention, the illuminator compensates for this elliptical warping of the radiation pattern for example, by dynamically adjusting the null-phase factors of the sum radiation pattern and observing the received pattern. The illuminator may also compensate for its motion. In one embodiment, the illuminator may generate a monostatic SAR image from the observed signals to verify construction of a static electromagnetic vector field.

Figure 3:
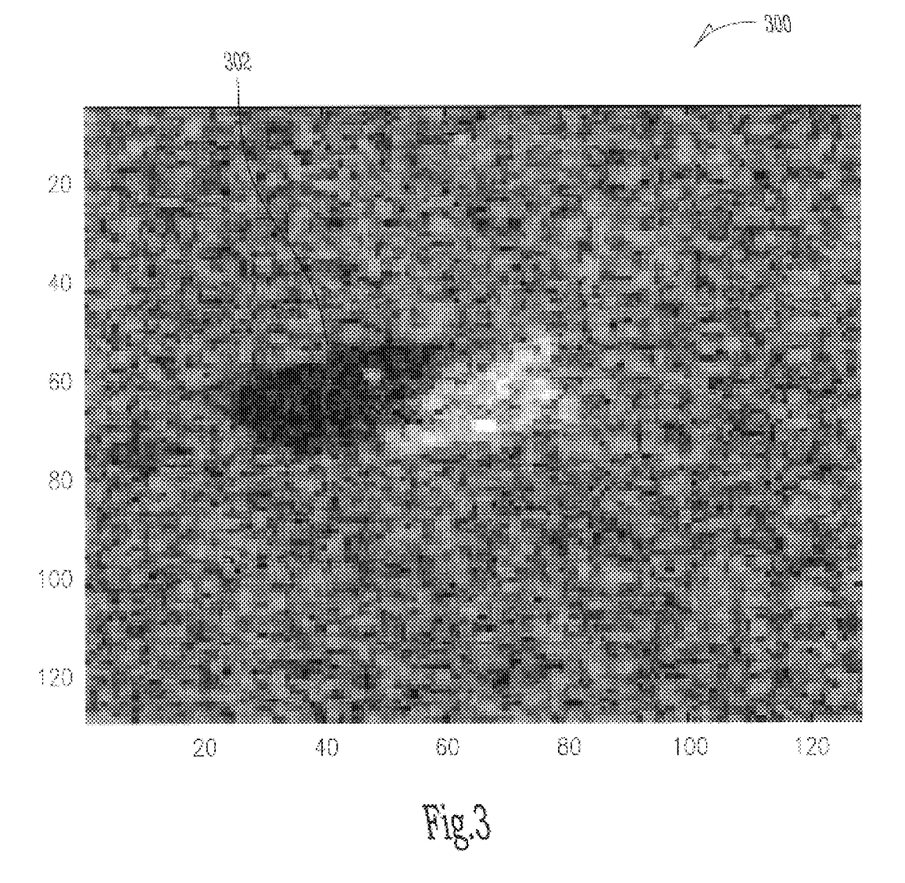
FIG. 3 is an illustration of a monstatic SAR image generated from observed signals in accordance with an embodiment of the present invention.

FIG. 3 is an illustration of a monstatic SAR image generated from observed signals in accordance with an embodiment of the present invention. Image 300 may be generated by the illuminator as described above, and in this example, target 302 is a monostatic SAR generated tank. Image 300 may be used as a reference image for comparison with a subsequently generated bistatic SAR image.

Figure 4:
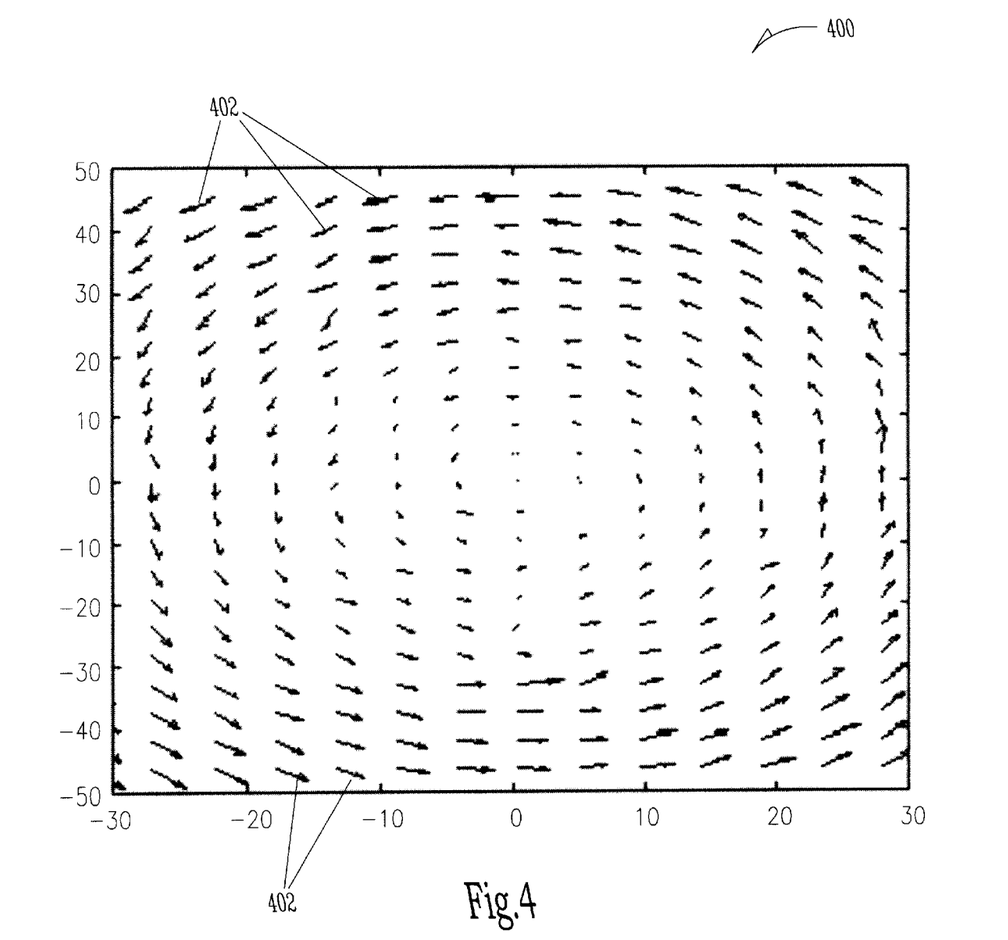
FIG. 4 is an example of an uncompensated static electromagnetic vector field in accordance with an embodiment of the present invention.

FIG. 4 illustrates an example of an uncompensated static electromagnetic vector field in accordance with an embodiment of the present invention. Static electromagnetic vector field 400 is the raw (uncompensated) electromagnetic vector field which may be perceived at the receiver before phase compensation. Electromagnetic vector field 400 represents an image of target 302 (FIG. 3) that may be generated by a bistatic receiver of the present invention. Electromagnetic vector field 400 is not aligned with a known field pattern. Static electromagnetic vector field 400 is an example of spatially static electromagnetic vector field that may be dynamically generated by an illuminator, such as illuminator 102 (FIG. I) and may be used by a receiver, such as receiver 104 (FIG. 1) as a reference to generate an image of a target area. Each vector 402 of field 400 may include magnitude and angle for a cell (e.g., a position) within a target area. Although vectors 402 are illustrated in a substantially circular pattern having the same magnitude and having their angle change in relation to the center of the area, this is not a requirement. Other static electromagnetic vector fields may be suitable for use as a reference field.

The components of field 400 may be stored in a memory of the receiver and may be used as a reference to determine the phase terms to compensate for distortion of an image. Phase compensation differences over sub-images may be used to further focus an image over a coherent collection period.

Figure 5:
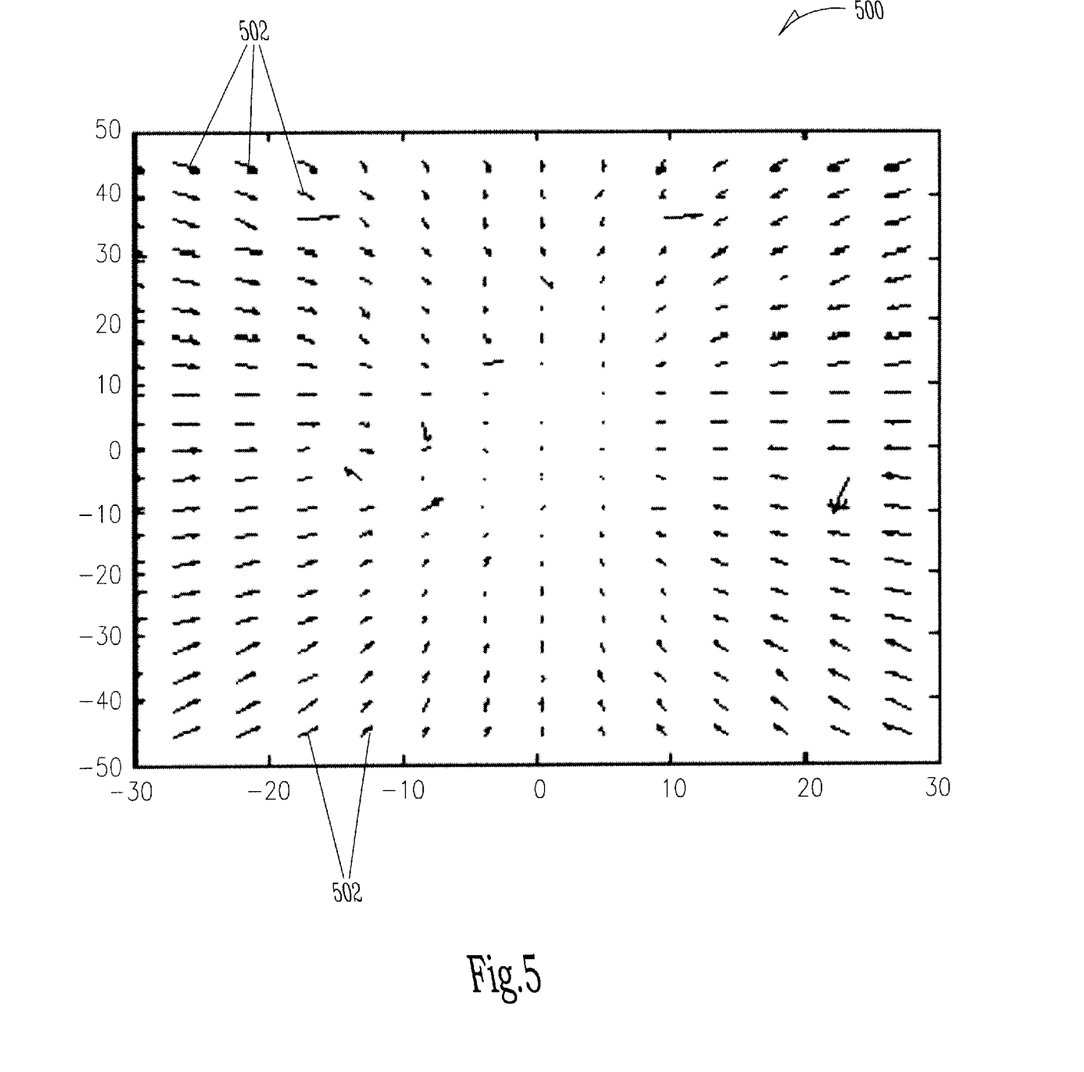
FIG. 5 is an example of a phase-compensated electromagnetic vector field generated from received signals in accordance with an embodiment of the present invention.

FIG. 5 illustrates an example of a phase-compensated electromagnetic vector field from received signals in accordance with an embodiment of the present invention. Electromagnetic vector field 500 is an example of a measured electromagnetic vector field which may be generated by a receiver, such as receiver 102 (FIG. 1), from received signals reflected from a target area. A receiver may calculate each vector 502 from a complex ratio of the received null-monopulse pattern to the sum pattern. Because an illuminator may have substantially constructed a reference static electromagnetic vector field such as vector field 400 (FIG. 4) at the target area, the receiver may correlate the measured electromagnetic field with the reference electromagnetic vector field to generate an image of the target area.

Figure 6:
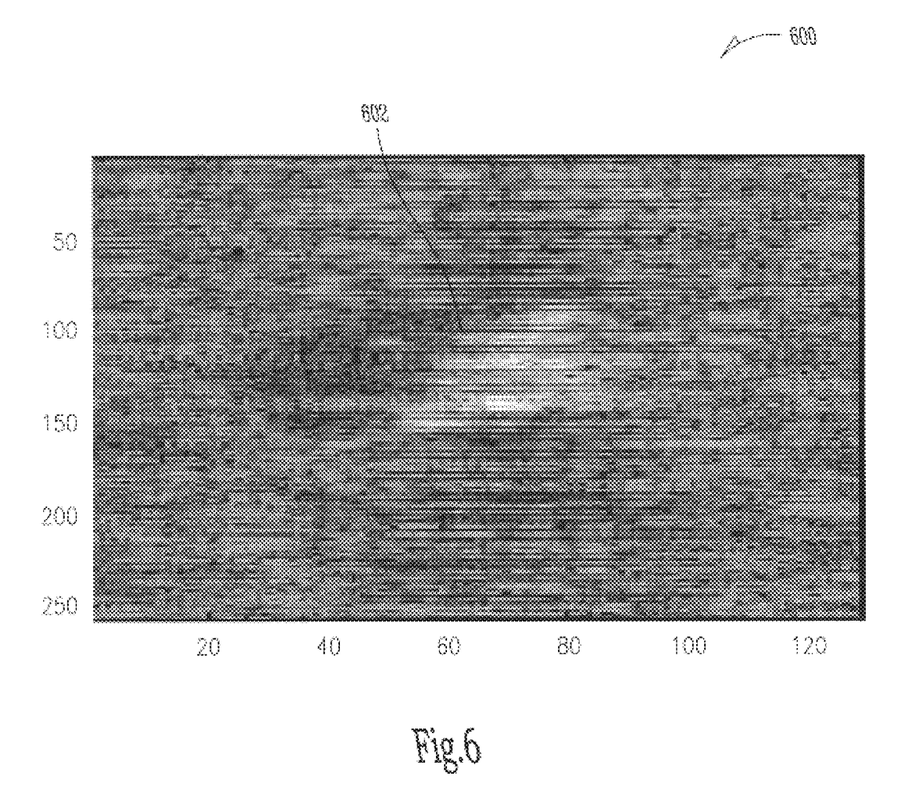
FIG. 6 is an illustration of a reconstructed bistatic SAR image in accordance with an embodiment of the present invention.

FIG. 6 is an illustration of a reconstructed bistatic SAR image in accordance with an embodiment of the present invention. Image 600 is an example of a reconstructed image generated with the derived phase correction vectors, and may correspond with image 300 (FIG. 3). The image of target 602 which may be, for example, a tank can be detected.

Figure 7:
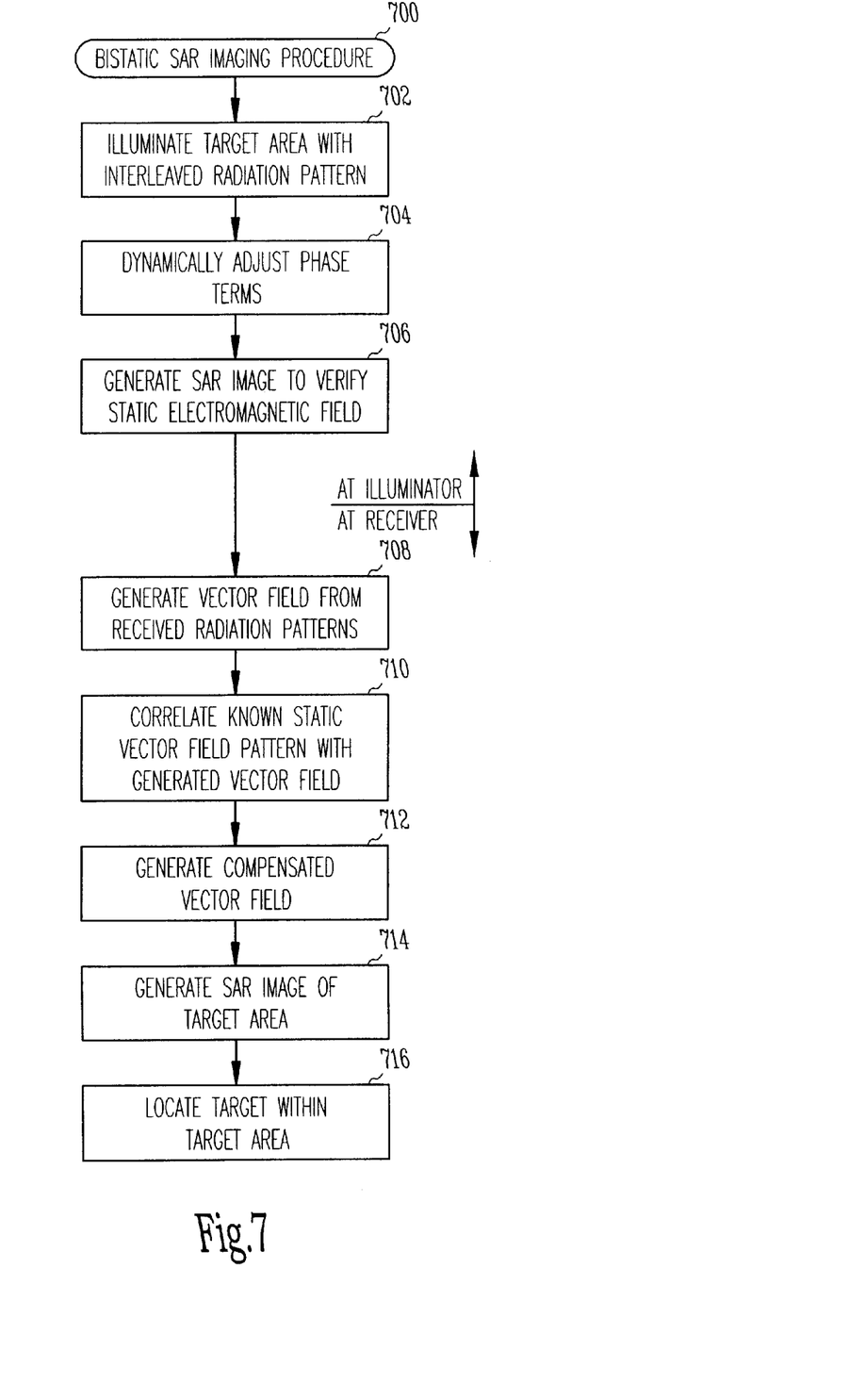
FIG. 7 is a flow chart of an imaging procedure in accordance with an embodiment of the present invention.

FIG. 7 is a flow chart of an image generating procedure in accordance with an embodiment of the present invention. Although the individual operations of procedure 700 are illustrated and described as separate operations, it should be noted that one or more of the individual operations may be performed concurrently. Further, nothing necessarily requires that the operations be performed in the order illustrated. Procedure 700 may be used by a bistatic SAR imaging system, such as system 100 (FIG. 1) for generating a bistatic SAR image of a target area. Operations 702 through 706 may be performed by an illuminator and operations 708 through 716 may be performed by a receiver.

In operation 702, a target area is illuminated with a radiation pattern by an illuminator. The illuminator may be an aircraft or satellite moving in a direction substantially orthogonal to the target area. The radiation pattern may comprise a null-monopulse radiation pattern interleaved with a sum radiation pattern. In operation 704, the phase terms of at least one of the transmitted radiation patters is adjusted to reduce and/or substantially eliminate distortion and generate a static electromagnetic vector field, such as static electromagnetic vector field 400 (FIG. 4) at the target area. For example, the null-phase factors of the sum radiation pattern may be adjusted dynamically to compensate for the aspect angle of the illuminator and, for example, the motion of the illuminator. In operation 706, the a SAR image may be generated by the illuminator for verification of the static electromagnetic filed. For example, the illuminator may receive the patterns reflected from the target area to verify the static vector field. The received signals may compensate for the motion of the illuminator as well as the angle between the illuminator and the target area. The combination of steps 702 through 706 may be continually performed by the illuminator to maintain a static electromagnetic vector field at the target area.

In operation 708, a receiver receives the radiation patterns reflected from the target area and generates a measured electromagnetic vector field pattern from the received signals. The measured electromagnetic vector field pattern may be based on the complex ratio of the null-monopulse radiation pattern to the sum radiation pattern. In operation 708, the measured vector field pattern is correlated with a known static electromagnetic field, such as field 400 (FIG. 4) to determine phase compensation terms for each vector of the field pattern. Operation 712 applies the phase compensation terms to generate a compensated electromagnetic vector field which is used in operation 714 by the receiver to generate the bistatic SAR image of the target area. In operation 716, the receiver may use the image of the target area to locate a target.

Thus, an improved method and system for generating of a bistatic SAR image has been described. In one embodiment, the method and system may generate a bistatic SAR image without a data-link to convey positional information between the illuminator and the receiver. In another embodiment, the method and system for generating a bistatic SAR image is accomplished without knowledge of the illuminator's position and heading.

The foregoing description of the specific embodiments reveals the general nature of the invention sufficiently that others can, by applying current knowledge, readily modify and/or adapt it for various applications without departing from the generic concept, and therefore such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. A bistatic synthetic aperture radar (SAR) imaging system comprising:

an illuminator to illuminate a target area with a null-monopulse radiation pattern and a sum radiation pattern, wherein phase terms of the sum radiation pattern are dynamically adjusted to maintain a substantially static electromagnetic vector field at the target area compensating, at least in part, for distortion resulting from a position of the illuminator; and a receiver to receive the radiation patterns reflected from the target area, to generate phase compensation terms by correlating a measured electromagnetic vector field with the static electromagnetic vector field, to generate an image of the target area using the phase compensation terms, to compare the generated image with a known image for identifying a target within the generated image.

2. The system of claim 1 wherein the illuminator adjusts the phase terms of the of the sum radiation pattern to compensate for an aspect angle of the illuminator relative to the target area, wherein the target area is comprised of a plurality of cells, and wherein the static electromagnetic vector field is a substantially constant phase and magnitude electromagnetic vector field for each cell of the target area.

3. The system of claim 1 wherein the receiver correlates the measured electromagnetic vector field with the static electromagnetic vector field to generate a two-dimensional phase compensation matrix comprised of phase compensation terms, the receiver adjusting phase terms of the received sum radiation pattern with the phase compensation terms to generate a bistatic SAR image of the target area.

4. The system of claim 1 wherein the illuminator interleaves the null-monopulse radiation pattern with the sum radiation pattern.

5. The system of claim 1 wherein the target area is on a surface of Earth and the illuminator is moving substantially in a direction orthogonal to the target area.

6. The system of claim 5 wherein the illuminator is one of either an aircraft or a satellite.

7. The system of claim 1 wherein the receiver is stationary with respect to the target area.

8. The system of claim 1 wherein the receiver is moving substantially in a direction towards the target area.

9. The system of claim 8 wherein the receiver is a missile having vectors of the static electromagnetic vector field stored therein.

10. The system of claim 1 wherein the receiver is further configured to locate a target within the target area based on the generated image of the target area.

11. The system of claim 1 wherein the illuminator transmits the radiation patterns with a quadrant feed antenna.

12. A bistatic synthetic aperture radar (SAR) imaging system comprising:
an illuminator to illuminate a target area with a null-monopulse radiation pattern and a sum radiation pattern, wherein phase terms of the sum radiation pattern are adjusted to maintain a substantially static electromagnetic vector field at the target area; and
a receiver to receive the radiation patterns reflected from the target area, to generate phase compensation terms by correlating a measured electromagnetic vector field with the static electromagnetic vector field, and to generate an image of the target area using the phase compensation terms,
wherein the illuminator observes energy reflected from the target area of the null-monopulse radiation pattern and the sum radiation pattern to maintain the static electromagnetic vector field at the target area, vectors of the vector field being determined from a ratio of the reflected null-monopulse radiation pattern and the reflected sum radiation pattern.

13. The system of claim 12 wherein the illuminator illuminates the target area with an illuminating antenna and also observes reflected energy through the illuminating antenna.

14. A method of generating a bistatic SAR image of a target area comprising:
at a moving illuminator,
illuminating a target area with a null-monopulse radiation pattern and a sum radiation pattern; and
adjusting the phase terms of the sum radiation pattern to maintain a substantially static electromagnetic vector field pattern at the target area, the adjusted phase terms compensating, at least in part, for distortion resulting from a position of the illuminator,
and at a receiver,
generating phase compensation terms to adjust phase terms by correlating a measured electromagnetic vector field pattern with the static electromagnetic vector field pattern;
generating an image of the target area using the phase compensation terms; and
comparing the generated image with a know image to identify a target in the target area.

15. The method of claim 14 wherein a receiver is separately located from the illuminator, the method further comprises:
at the illuminator, adjusting the phase terms of the of the sum radiation pattern to compensate for an aspect angle of the illuminator relative to the target area, wherein the target area is comprised of a plurality of cells, and wherein the static electromagnetic vector field is a substantially constant phase and magnitude electromagnetic vector field for each cell of the target area.

16. The method of claim 14 wherein generating the phase compensation terms comprises correlating the measured electromagnetic vector field pattern with the static electromagnetic vector field pattern to generate a two-dimensional phase compensation matrix comprised of phase compensation terms, the receiver using the matrix to generate a bistatic SAR image of the target area.

17. The method of claim 14 wherein illuminating comprises interleaving the null-monopulse radiation pattern with the sum radiation pattern.

18. The method of claim 14 wherein the target area is on a surface of Earth and the illuminator is moving substantially in a direction orthogonal to the target area.

19. A method of generating a bistatic SAR image of a target area comprising:
at a moving illuminator,
illuminating a target area with a null-monopulse radiation pattern and a sum radiation pattern; and
adjusting the phase terms of the sum radiation pattern to maintain a substantially static electromagnetic vector field pattern at the target area,
and at a receiver,
generating phase compensation terms to adjust phase terms by correlating a measured electromagnetic vector field pattern with the static electromagnetic vector field pattern;
generating an image of the target area using the phase compensation terms; and
observing, by the illuminator, energy reflected from the target area to maintain the static electromagnetic vector field pattern at the target area, vectors of the vector field being determined from a ratio of the reflected radiation patterns.

20. A receiver for generating a bistatic synthetic aperture radar (SAR) image of a target area comprising:
an antenna to receive radiation patterns reflected from the target area; and
a processing element to generate phase compensation terms by correlating a measured electromagnetic vector field with a static electromagnetic vector field, the static electromagnetic field having phase terms dynamically compensated for changing position of an illuminator, to generate an image of the target area using the phase compensation terms, and to compare the generated image with a stored image of the target area to identify a target in the target area.

21. The receiver of claim 20 further comprising a memory to store components of the static electromagnetic vector field and to store the stored image of the target area.

22. The receiver of claim 21 wherein the illuminator illuminates the target area with a null-monopulse radiation pattern interleaved with a sum radiation pattern, and dynamically adjusts the phase terms of the sum radiation pattern to maintain the static electromagnetic vector field at the target area, wherein the target area is comprised of a plurality of cells, and wherein the static electromagnetic vector field is maintained by the illuminator to be a substantially constant phase and magnitude electromagnetic vector field for each cell of the target area.

* * * * *